(12) United States Patent
Goldstein

(10) Patent No.: US 10,013,430 B2
(45) Date of Patent: Jul. 3, 2018

(54) REMOTELY STORED APPLICATION FILES

(71) Applicant: VMware, Inc., Palo Alto, CA (US)

(72) Inventor: Lyor Goldstein, Herzliya (IL)

(73) Assignee: VMware, Inc., Palo Alto, CA (US)

( * ) Notice: Subject to any disclaimer, the term of this patent is extended or adjusted under 35 U.S.C. 154(b) by 817 days.

(21) Appl. No.: 14/462,253

(22) Filed: Aug. 18, 2014

(65) Prior Publication Data

US 2016/0048533 A1     Feb. 18, 2016

(51) Int. Cl.
G06F 17/30     (2006.01)
H04L 29/08     (2006.01)
G06F 9/00      (2006.01)

(52) U.S. Cl.
CPC .......... G06F 17/30194 (2013.01); G06F 9/00 (2013.01); G06F 17/30864 (2013.01); H04L 67/06 (2013.01); H04L 67/10 (2013.01)

(58) Field of Classification Search
CPC ................ G06F 17/30194; G06F 9/00; G06F 17/30864; H04L 67/06; H04L 67/10
See application file for complete search history.

(56) References Cited

U.S. PATENT DOCUMENTS

| | | | |
|---|---|---|---|
| 6,324,691 B1 * | 11/2001 | Gazdik | G06F 8/61 709/200 |
| 6,842,770 B1 * | 1/2005 | Serlet | G06F 17/30067 707/E17.01 |
| 8,051,043 B2 * | 11/2011 | Young | G06F 11/1004 707/646 |
| 8,510,717 B2 * | 8/2013 | Georgieva | G06F 8/60 717/124 |
| 2005/0044233 A1 * | 2/2005 | Cai | H04L 29/06 709/227 |
| 2005/0191991 A1 * | 9/2005 | Owen | H04W 24/02 455/411 |
| 2005/0198165 A1 * | 9/2005 | Reddel | G06Q 10/08 709/206 |
| 2007/0083610 A1 * | 4/2007 | Treder | H04L 67/34 709/217 |
| 2007/0244987 A1 * | 10/2007 | Pedersen | H04L 63/0272 709/217 |
| 2008/0114860 A1 * | 5/2008 | Keys | G06F 8/61 709/219 |
| 2008/0134164 A1 * | 6/2008 | Stich | G06F 8/65 717/172 |

(Continued)

Primary Examiner — Jared M Bibbee
(74) Attorney, Agent, or Firm — Fish & Richardson P.C.

(57) ABSTRACT

Systems and techniques are described for distributing and resolving application files. A described technique includes receiving, for an application, selection data specifying one or more referenced application files. The one or more referenced application files can be a proper subset of a set of application files used by the application. A distribution bundle for the application can be provided to a remote system. The distribution bundle can include one or more included application files that were not selected from the set of application files and a descriptor that includes a reference to each of the one or more referenced application files. The descriptor can cause the remote system to retrieve the one or more referenced application files from one or more remote repositories in response to the application being initialized by the remote system.

22 Claims, 4 Drawing Sheets

(56) References Cited

U.S. PATENT DOCUMENTS

| | | | | |
|---|---|---|---|---|
| 2009/0282255 A1* | 11/2009 | Sherkin | ............... | H04L 9/3236 |
| | | | | 713/176 |
| 2011/0173251 A1* | 7/2011 | Sandhu | ............... | G06F 8/61 |
| | | | | 709/203 |
| 2013/0047150 A1* | 2/2013 | Malasky | ............... | G06F 8/61 |
| | | | | 717/176 |
| 2013/0232229 A1* | 9/2013 | Firman | ............... | G06F 8/61 |
| | | | | 709/219 |
| 2015/0046914 A1* | 2/2015 | Sahoo | ............... | G06F 9/44521 |
| | | | | 717/166 |
| 2015/0121517 A1* | 4/2015 | Dimov | ............... | G06F 21/445 |
| | | | | 726/20 |

* cited by examiner

REMOTELY STORED APPLICATION FILES

BACKGROUND

This document relates to storing and distributing files for an application.

Some software platforms allow for the use of reusable components, e.g., modules that perform common functions and that may be used by multiple different software applications. For example, an application may use standard modules for database access, data logging, security, and/or user interface design. The reuse of components allows application developers to focus on the actual logic or code of the application.

SUMMARY

This document relates to storing, distributing, and resolving files for an application at runtime.

In general, one aspect of the subject matter described in this document can be embodied in a technique that includes receiving, for an application, selection data specifying one or more referenced application files, the one or more referenced application files being a proper subset of a set of application files used by the application; and providing, to a remote system, a distribution bundle for the application, the distribution bundle including: one or more included application files that were not selected from the set of application files; and a descriptor that includes a reference to each of the one or more referenced application files, the descriptor causing the remote system to retrieve the one or more referenced application files from one or more remote repositories in response to the application being initialized by the remote system.

These and other aspects can optionally include one or more of the following features. Some implementations include generating the distribution bundle based on the selection data. The generating can include bundling the included application files in the distribution bundle and generating the descriptor based on the selection data.

Some implementations include receiving location data specifying the one or more remote repositories. The descriptor can include a reference to each of the one or more remote repositories. Some implementations include generating an updated version of one of the referenced application files; generating an updated expected signature for the one referenced application file; and sending an update to the remote system that includes the updated expected signature and that causes the remote system to retrieve the updated version of the one referenced application file.

In some implementations, the distribution bundle includes an expected signature for each application file of the set of application files. The distribution bundle can include instructions that cause the remote system to compare the expected signature for each application file to an actual signature for each application file in response to receiving a command to initialize the application. In some implementations, the distribution bundle includes a tamper policy that specifies actions for the remote system to perform in response to determining that an expected signature for a particular application file does not match the actual signature for the particular application file. An action specified by the tamper policy can include retrieving a new copy of a particular referenced application file in response to determining that the expected signature for the particular referenced application file does not match the actual signature for the particular referenced application file.

In general, another aspect of the subject matter described in this document can be embodied in a technique that includes receiving a request to initialize an application; accessing a distribution bundle for the application, the distribution bundle including: one or more included application files; and a descriptor that includes a reference to each of one or more referenced application files; retrieving, based on the references, the one or more referenced application files from one or more remote repositories in response to the request to initialize the application; and loading the one or more included application files and the one or more referenced application files.

These and other aspects can optionally include one or more of the following features. In some implementations, the descriptor includes a reference to each of the one or more repositories. The descriptor can include location data that specifies a network location for each of the one or more repositories. The one or more referenced application files can be retrieved using the location data.

In some implementations, the distribution bundle includes an expected signature for each referenced application file. Some implementations include receiving a command to initialize the application and comparing the expected signature for each referenced application file to an actual signature for each referenced application file.

In some implementations, the distribution bundle includes a tamper policy that specifies an action to be performed in response to determining that an expected signature for a particular referenced application file does not match the actual signature for the particular referenced application file. Some implementations include determining, based on the comparison, that the expected signature for the particular referenced application file does not match the actual signature for the particular referenced application file. Some implementations include performing the action in response to determining that the expected signature for the particular referenced application file does not match the actual signature for the particular referenced application file.

Particular embodiments of the subject matter described in this document can be implemented so as to realize one or more of the following advantages. The data size of an application's distribution bundle can be decreased by storing one or more of the application's files in repositories and allowing the application to download the file(s) when the application is initialized. An update to an application file can be made by allowing the application to download a new version of that file without redistributing the entire distribution bundle with the updated file. Application developers can select which files to bundle in the distribution bundle for a particular application and which files to distribute from a remote repository.

The details of one or more embodiments of the subject matter described in this document are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
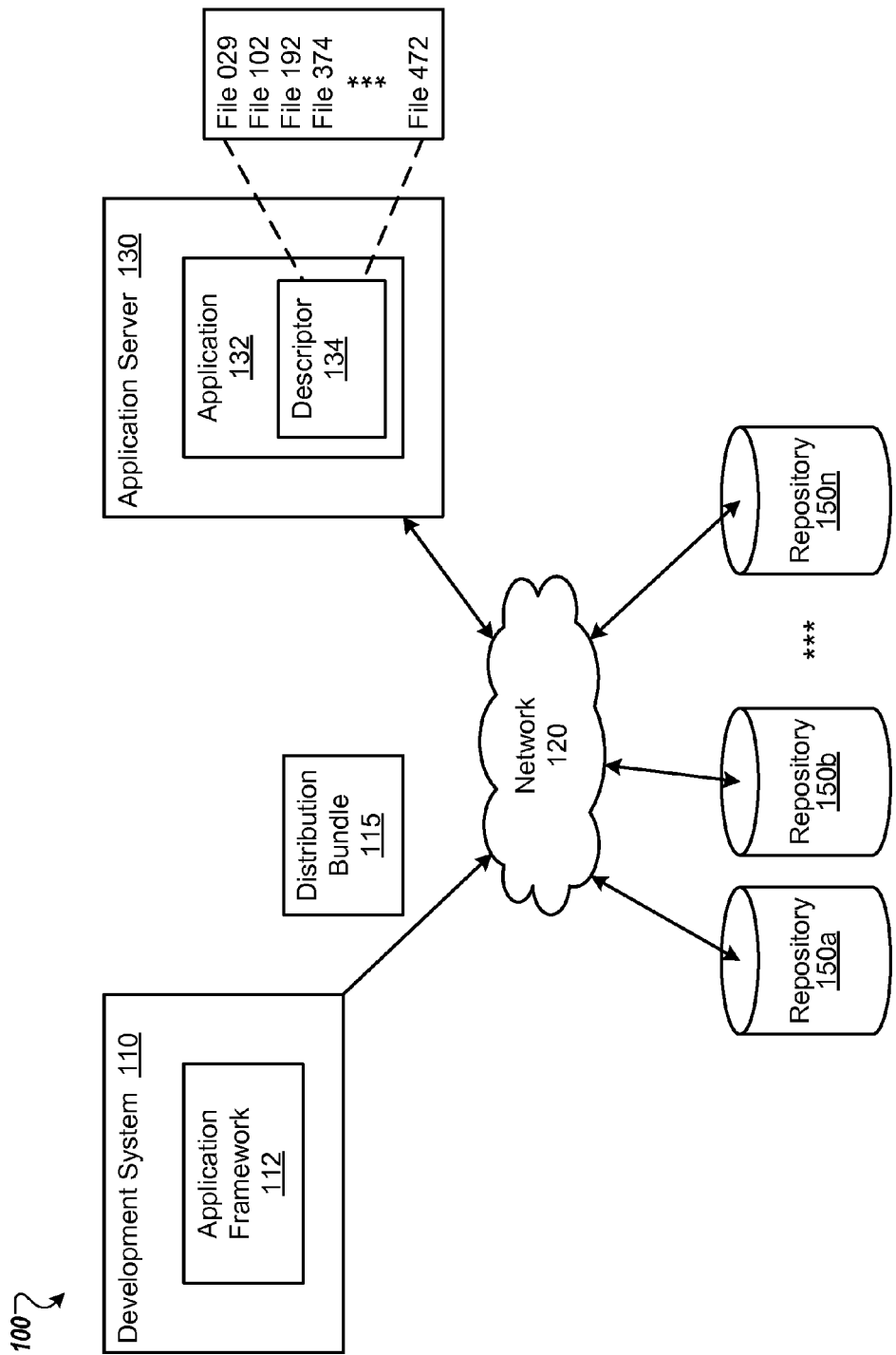
FIG. 1 shows an architecture for an example system that is configured to allow application files to be downloaded from remote repositories.

This document generally describes techniques for distributing application files for an application. An application file can include data used by, or related to, the application. For example, an application file may include application modules, archives, metadata, libraries, resources, e.g., images, text, and so on, or other appropriate data for the application. The files for an application can be distributed in a distribution bundle and/or from remote repositories.

A distribution bundle for an application is a bundle of files and data that can be used to install the application, execute the application, and/or that is referenced by the application. For example, a distribution bundle may include an installation file that causes a computer system to install the application and/or an executable file that causes the computer system to execute the application. The distribution bundle can also include other application files used by the application, e.g., modules, libraries, and so on.

A distribution bundle can also include references to one or more application file(s) that are not included in the distribution bundle. These referenced application files can be retrieved from a remote repository, e.g., a repository that is remote from a computer system on which the application executes. The distribution bundle can include data specifying each referenced application file and, for each referenced application file, a reference to the remote repository from which the referenced application file can be retrieved, e.g., downloaded. When the application is first initialized by a computer system, the application can cause the system to download each referenced application file from the repository. In this way, the referenced application files can be retrieved at runtime, rather than when the application is initially built. The referenced application files and the application files included in the distribution bundle can then be loaded by the computer system and used by the application.

An application developer can select which application files to include in the distribution bundle and which application files to distribute by way of remote repositories. This allows the developers to customize how their files are distributed. For example, an application developer may not trust the use of remote repositories to distribute certain application files. In another example, an application developer may want to limit the size of a distribution bundle by including references to repositories for larger files rather than including the larger files in the distribution bundle. In yet another example, the application developer may use references to repositories to distribute application files that have a tendency to be modified more often than other application files. By distributing these files using references to repositories where the referenced files are maintained, the distribution bundle does not have to be rebuilt and redistributed each time that one of these files is modified.

FIG. 1 shows an architecture for an example system 100 that is configured to allow application files to be downloaded from remote repositories. The example system 100 includes a network 120, e.g., a local area network (LAN), wide area network (WAN), e.g., the Internet, or a combination thereof.

The network 120 connects a development system, an application server 130, and application file repositories 150a-150n.

The development system 110 is a system of one or more computers that includes an application framework 112 that allows an application developer to develop applications. For example, the development system 110 may include a Java™ framework that allows an application developer to develop Java applications. The application framework 112 can allow the developer to generate application code and select one or more application files for use by the application. The application files may include reusable components that can be selected for use by multiple applications. For example, the application files may include modules that provide standard functionality for applications and/or custom modules developed and used by an application developer. In a Java™ framework, reusable components are commonly referred to as "artifacts" and are commonly stored in the Java Archive (JAR) format.

The application framework 112 can build a distribution bundle 115 for an application based on application code for the application, also referred to as business logic, and optionally application files selected by the developer. For applications that include application files, e.g., artifacts, the application framework 112 allows developers or other users to select which application files, if any, to include in the distribution bundle and which application files, if any, should be retrieved from a remote repository 150a-150n. Application files that are included in the distribution bundle are referred to herein as "included application files." The application framework 112 can include in the distribution bundle 115 the included application files based on the selections made by a user.

The application framework 112 can also include in the distribution bundle 115 one or more descriptors that reference the application files that were selected for retrieval from a remote repository 150a-150n. Application files that are referenced by the distribution bundle, rather than being included in the distribution bundle, are referred to herein as "referenced application files." The descriptor(s) that include the references to the referenced application files may be a part of code that runs prior to the application's main code to download or load previously retrieved application files. For example, the descriptor may be a part of a bootstrap code that runs before the main application code and that causes a computer system that is installing or initializing the application to retrieve the referenced application files from a remote repository 150a-150n or load the application files from local storage if the referenced application files were previously retrieved. The distribution bundle 115 may include a single descriptor that references each referenced application file or a separate descriptor for each respective application file.

A distribution bundle for an application may include one or more included application files and a descriptor that references one or more referenced application files; one or more included application files and no descriptor for referenced application files if all of the application files for the application files are included in the distribution bundle; or a descriptor that references referenced application files and no included application files if all of the application files for the application are referenced. For example, an application developer may select a set of files for an application. The application developer may then select a subset, e.g., a proper subset, of the set of application files as included application files and/or a subset of the set of application files, e.g., a proper subset, of the set of application files as referenced application files. A proper subset is a subset of the set of application files that does not include at least one application file of the set of application files.

The repositories 150a-150n store application files and distribute application files, for example, in response to requests initiated by applications. The repositories 150a-150n can be remote from computer systems that execute the applications and provide the application files by way of the network 120. The repositories 150a-150n can include common repositories that store and distribute application files for multiple different applications and/or multiple different application developers. For example, the repositories 150a-150n may include a global repository for storing and distributing standard or common application files that can be used by multiple applications and developers. The repositories 150a-150n can include application specific repositories that each stores and distributes application files for a particular application. For example, an application developer may create a repository that stores application files referenced by a particular application. The repositories 150a-150n can include application developer specific repositories that each stores and distributes application files for a particular application developer. For example, an application developer may create a repository that stores application files that are used by one or more of the developer's applications.

The application framework 112 may also allow the application developer to select one or more particular repositories 150a-150n for storing and distributing the referenced application files. For example, the application developer may specify a repository 150a-150n for each application file of an application, for a group of application files for an application, or for all application files of an application. In a particular example, one application file for a particular application may be downloaded from a common or global repository, while another file for the application may be downloaded from an application specific or application developer specific repository, e.g., created by or for the application developer. The application framework 112 can include in a distribution bundle 115 for an application references to the one or more repositories in which the application's files are stored.

The references to the repositories can include location data that specifies a network location at which each referenced application file can be downloaded. For example, the references can include addresses, e.g., network addresses to the repositories. In a particular example, the references may include a uniform resource locator (URL) for each of the repositories. The location data can also specify the location in the repository where the application file is located. For example, the application files may be organized into folders, subfolders, and so on. In this example, the location data can specify the folder in which the application file is stored.

The application framework 112 may also allow application developers to select a protocol for requesting and downloading the application files. For example, an application developer may select a hypertext transfer protocol (HTTP), a proprietary protocol, or another appropriate protocol. Application files for an application may have different protocols. For example, an application file that is downloaded from a common repository may use HTTP, while another application file may be downloaded from an application specific repository using a proprietary protocol. The descriptor for the application can include data specifying each referenced application file, a repository for each referenced application file, and/or a protocol used for downloading each referenced application file. Downloaded application files may be stored at the application server 130, e.g., in a local storage system.

The distribution bundle 115 for an application can also include data for application security. For example, this data may be used to ensure that application files are the correct version and/or have not been modified. In some implementations, the distribution bundle may include an expected signature for each application file, e.g., each included application file and/or each referenced application file. Before loading the application file(s), the application server 130 on which the application is to execute can compare the expected signature for each application file to an actual signature of the application file. The actual signature for the application file is the actual signature computed for the application file stored at the application server 130. For example, the application server 130 can compute the signature for the stored application file using an encryption algorithm and compare the computed signature to the expected signature for the application file.

If the signatures do not match for an application file, the application server 130 may implement a tamper policy, e.g., based on instructions included in the distribution bundle. For example, the distribution bundle 115 may include instructions that cause the application server 130 to re-download a referenced application file or generate an error message and preclude the application from executing when the expected signature for the referenced application file does not match the actual signature of the application file. The tamper policy may specify a particular action for each application file, each type of application file (e.g., included or referenced), or for all application files of the application. For example, the tamper policy may specify that referenced files are to be downloaded if the signatures do not match while errors are generated for included application files of the signatures do not match. The tamper policy may specify other actions, e.g., to send an e-mail, text message, or instant message to an administrator or other user alerting the user of the issue, to reboot the application or system, to run an automated process that allows a user to provide instructions on how to respond to the issue, and/or provide audio, visual, or tactile feedback, to name a few examples.

The distribution bundle 115 for an application can be provided to application servers, e.g., the application server 130, and/or other types of computers that can execute the application. The application server 130 can install the application 132 using the received distribution bundle 115. During installation, the application server 130 may execute the code that includes the descriptor 134. This code causes the application server 130 to download any referenced application files referenced by the descriptor. For example, the code may cause the application server 130 to retrieve the referenced application files from one or more repositories 150a-150n specified by the descriptor 134. The retrieved application files can be stored in a local storage system, e.g., a local cache. The application server 130 can then load the referenced application files and any included applications files, and execute the application 132.

In some implementations, application files may depend on other application files. These dependencies may be specified in the descriptor, for example, by the application developer or the application framework. For example, the application developer may know that a module of application file A depends on a module of application file B. The application developer may select both application files for the application, for example as referenced application files and/or included application files. In some implementations, the application framework 112 includes a dependency management mechanism that handles dependencies between application files. For example, if an application developer selects application A as a referenced application file for an application, a reference to application A may be included in a descriptor of the application's distribution bundle. The dependency management mechanism may also automatically include in the descriptor a reference to application file B as application A depends on application B.

When a referenced application file is updated, for example by the application developer or by a third-party developer of the file, an update can be sent to a computer system on which the application is installed. The update, which may be implemented as a text file or other file, may cause the system to retrieve the updated application file, e.g., the next time the application is initialized. The update may also include a new expected signature for the updated application file so that the computer system can ensure that the correct application file is being loaded for the application. For example, an updated expected signature can be generated for the updated application file and included in the update for the updated application file. This process of updating an application's files prevents the application developer from needing to redistribute the entire distribution bundle to the system for an update to a file referenced in the bundle.

Figure 2:
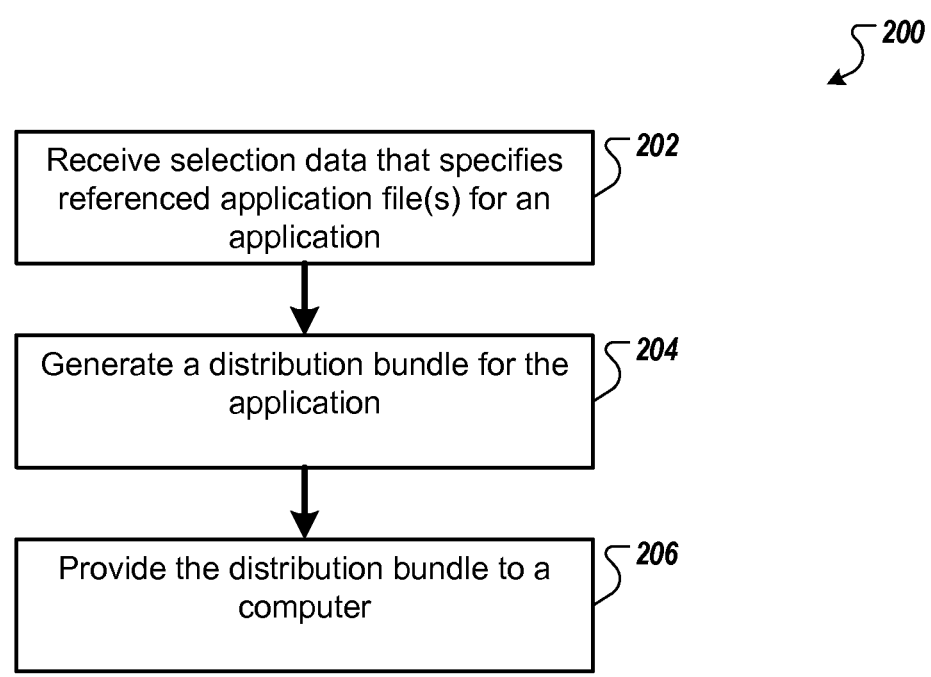
FIG. 2 is a flow diagram of an example technique for generating and providing a distribution bundle that includes referenced files.

FIG. 2 is a flow diagram of an example technique 200 for generating and providing a distribution bundle that includes referenced files. The example technique 200 is performed by a system of one or more computers. For example, the technique 200 may be performed by the development system 110 of FIG. 1.

The system receives selection data that specifies one or more referenced application files for an application (202). For example, an application developer may select applications files for use or reference by the application. From these application files, the application developer may select one or more referenced application files that are not to be included in a distribution bundle for the application. Instead, the referenced application(s) may be retrieved, e.g., downloaded, from a repository when the application is initialized, e.g., at runtime. As described above, a particular repository and/or protocol for downloading each referenced application file may also be selected.

The system generates a distribution bundle for the application (204). The system can include in the distribution bundle application code or business logic for the application, zero or more application files for use or reference by the application when the application is executing, and/or data that specifies zero or more referenced application files. For example, the system may generate, based on the selection data, a respective descriptor for each of the referenced application files. The descriptor may be a part of a bootstrap code that runs before the main application code can cause a computer system that is installing to download the application files. As described above, the descriptor may also include data that specifies a particular repository for each referenced application file and/or a particular protocol for downloading each referenced application file.

The system provides the distribution bundle to a computer system (206). For example, the system may provide the distribution bundle to a computer system, e.g., an application server, in response to receiving a request for the application. The computer system may be remote from the system.

Figure 3:
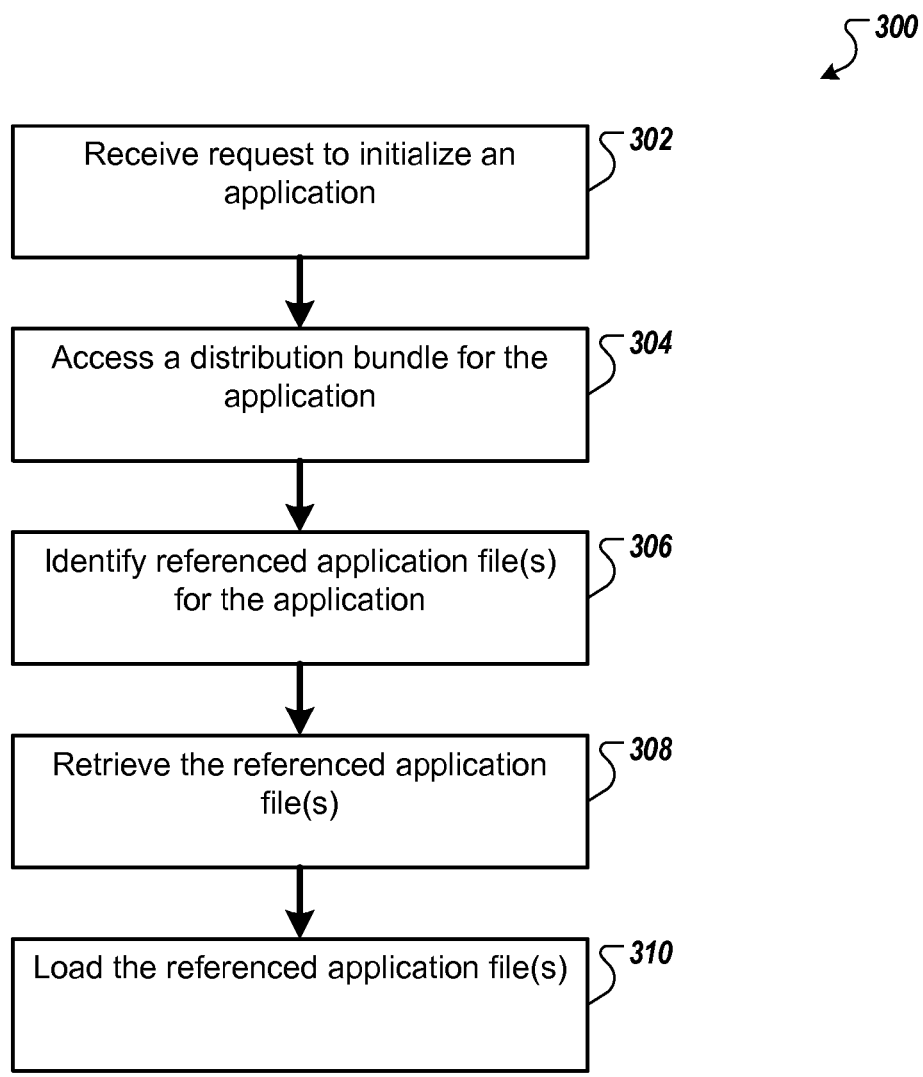
FIG. 3 is a flow diagram of an example technique for retrieving and loading referenced files for an application.

FIG. 3 is a flow diagram of an example technique 300 for retrieving and loading referenced files for an application. The example technique 300 is performed by a system of one or more computers. For example, the technique 300 may be performed by the application server 130 of FIG. 1. The example technique 300 may be performed when the application is initialized at the system for the first time.

The system receives a request a request to initialize an application (302). For example, a user may initiate the installation or execution of the application.

The system accesses a distribution bundle for the application (304). The distribution bundle can include any included application files for the application and a descriptor that includes a reference to any referenced application files for the application. The descriptor can also include data that specifies a particular repository for each referenced application file and/or a particular protocol for retrieving each referenced application file. For example, the descriptor may include location data that specifies a network location at which each referenced application file can be retrieved. The distribution bundle for the application can also include an expected signature for each application file.

The system identifies the referenced application files referenced by the descriptor (306). The system may identify the referenced application files in response to the request to initialize the application. For example, the descriptor may be included in bootstrap or other code that executes before the application's main code or installation code executes. The descriptor may cause the system to request the referenced application files from a remote repository.

The system retrieves the referenced application files from one or more remote repositories (308). For each referenced application file, the system may send a request to the remote repository that stores the referenced application file. In response, the repository may send the application file to the system on which the application is being initialized. Application files for an application may be stored at multiple repositories. The system can identify, in the descriptor, the location of the repository for each application file and request the application file from that repository. Once retrieved, the referenced application files may be stored locally by the system. For example, the referenced application files may be stored in a local cache of the system.

In some implementations, the system may retrieve data from a remote location, for example, instead of an application file. For example, the descriptor may include a URL to a web resource that includes data used by the application. In this example, system may access the web resource using the URL included in the descriptor and retrieve the data for use by the application.

In some implementations, the system may ensure that the correct application files are downloaded/stored before loading the application files and executing the application. For example, the system may compare an expected signature for each application file to an actual signature for the application. If the signatures do not match, the system may implement a tamper policy, as described below with reference to FIG. 4.

The system loads the included application files and the referenced application files (310). Once loaded, the system may execute the application using the loaded files.

As described above, the technique 300 can be performed when the application is initialized for the first time at the system. For subsequent initializations, the system may load the application files from a local storage system. For example, the downloaded referenced application files may be stored in the local storage system and loaded when the application is re-initialized. If a referenced application file has been updated and the system has received an update for the application since a previous initialization, the system may download the updated version of the application file. For example, the application may include instructions, e.g., in bootstrap code, that causes the system to check for any updates. If an update is found, the system may download each application file specified by the update. The downloaded application files may then be loaded instead of the previously stored version of the application files.

Figure 4:
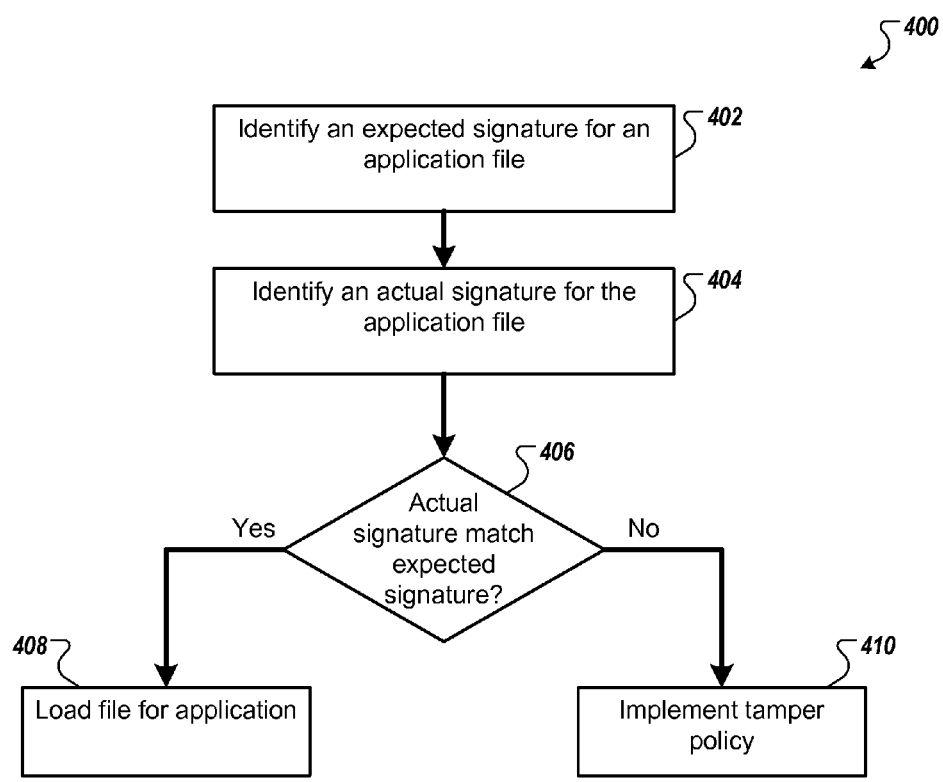
FIG. 4 is flow diagram of an example technique for determining whether a referenced file has a correct signature and taking action based on the determination.

FIG. 4 is flow diagram of an example technique 400 for determining whether an application file has a correct signature and taking action based on the determination. The example technique 400 is performed by a system of one or more computers. For example, the technique 400 may be performed by the application server 130 of FIG. 1.

The technique 400 can be performed when an application is being installed and/or each time the application is initialized. For example, the technique 400 can be performed each time the application is initialized or restarted to ensure that application files have not been modified. In some implementations, bootstrap code for the application includes instructions that cause the system that is initializing the application to perform the technique 400. The example technique 400 is described in terms of determining whether referenced application files have a correct signature. However, the technique 400 can be used to verify signatures for referenced application files and/or included application files.

The system identifies an expected signature for each referenced application file (402). The expected signature for the referenced application files may be included in the distribution bundle for the application. For example, the distribution bundle may include a signature file that has the expected signature for each referenced application file. The signature file may be stored locally by the system, e.g., in a local storage system. If an application file is updated and an updated version of the application file is downloaded to the system, the system may update the locally stored application file to include the expected signature of the updated application file. For example, as described above, the update may include the expected signature for the updated application file.

The system identifies an actual signature for each referenced application file (404). For example, the system may calculate the signature for each referenced application file based on instructions included in the application's bootstrap code. The instructions may cause the system to execute an encryption algorithm to determine the signature for each referenced application file.

For each referenced application file, the system determines whether the actual signature for the referenced application file matches the expected signature for the referenced application file (406). For example, the system may compare the actual signature for the referenced application file to the expected signature for the referenced application file to determine whether the signatures match.

If the actual signature for the referenced application file matches the expected signature for the referenced application file, the system loads the referenced application file (408). For example, if the signatures match for each referenced application file, the system may proceed to load the application files and execute the application.

If the actual signature for the referenced application file does not match the expected signature for the referenced application file, the system may implement a tamper policy (410). The tamper policy may specify an action to be performed if the signatures for a referenced application file do not match. For example, the tamper policy may specify that the system should generate an error message and preclude the loading of the application file if the signatures for the application file do not match. In another example, the tamper policy may specify that the system should re-download the referenced application file from a remote repository.

Embodiments of the subject matter and the operations described in this document can be implemented in digital electronic circuitry, or in computer software, firmware, or hardware, including the structures disclosed in this document and their structural equivalents, or in combinations of one or more of them. Embodiments of the subject matter described in this document can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this document can be implemented as operations performed by a data processing apparatus on data stored on one or more computer-readable storage devices or received from other sources. The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this document can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this document can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this document, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this document contains many specific implementation details, these should not be construed as limitations on the scope of any inventions or of what may be claimed, but rather as descriptions of features specific to particular embodiments of particular inventions. Certain features that are described in this document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   receiving, for an application that uses a set of application files, selection data specifying one or more referenced application files that have been selected by a user for hosting by one or more remote repositories rather than being included in a distribution bundle for the application, the one or more referenced application files being a proper subset of the set of application files used by the application;
   generating, based on the selection data, the distribution bundle for the application, the generating comprising:

including, in the distribution bundle, application code of the application;

determining, from the selection data, that the set of application files used by the application includes one or more included application files that have not been selected by the user for hosting by the one or more remote repositories;

in response to the determining, including, in the distribution bundle, the one or more included application files; and including, in the distribution bundle and based on the selection data, a descriptor that includes a reference to each of the one or more referenced application files but does not include the one or more referenced application files themselves, the descriptor causing the remote system to retrieve the one or more referenced application files from the one or more remote repositories in response to the application being initialized by the remote system, each referenced application file being referenced by the descriptor and not included in the distribution bundle; and providing the distribution bundle to a remote system.

2. The method of claim 1, wherein the generating comprises:

generating the descriptor based on the selection data.

3. The method of claim 1, further comprising receiving location data specifying the one or more remote repositories, wherein the descriptor includes a reference to each of the one or more remote repositories.

4. The method of claim 1, further comprising:

generating an updated version of one of the referenced application files;

generating an updated expected signature for the one referenced application file; and sending an update to the remote system that includes the updated expected signature and that causes the remote system to retrieve the updated version of the one referenced application file.

5. The method of claim 1, wherein:

the distribution bundle includes an expected signature for each application file of the set of application files; and the distribution bundle includes instructions that cause the remote system to compare the expected signature for each application file to an actual signature for each application file in response to receiving a command to initialize the application.

6. The method of claim 5, wherein the distribution bundle includes a tamper policy that specifies actions for the remote system to perform in response to determining that an expected signature for a particular application file does not match the actual signature for the particular application file.

7. The method of claim 6, wherein an action specified by the tamper policy includes retrieving a new copy of a particular referenced application file in response to determining that the expected signature for the particular referenced application file does not match the actual signature for the particular referenced application file.

8. A computer-implemented method comprising:

receiving a request to initialize an application that uses a set of application files;

accessing a distribution bundle for the application, the distribution bundle being generated based on selection data specifying one or more referenced application files that have been selected by a user for hosting by one or more remote repositories rather than being included in the distribution bundle for the application, the one or more referenced application files being a proper subset of the set of application files, the distribution bundle including:

application code of the application;

one or more included application files that are in a set of application files used by the application but are not among one or more referenced application files, wherein each included application file is included in the distribution bundle based on a determination, from the selection data, that the set of application files includes the one or more included application files that have not been selected by the user for hosting by the one or more remote repositories; and a descriptor that includes a reference to each of the one or more referenced application files but does not include the one or more referenced application files themselves, each referenced application file being an application file of the set of application files that has been selected by a user as a referenced application file, wherein each referenced application file is referenced by the descriptor and not included in the distribution bundle;

retrieving, based on the references, the one or more referenced application files from one or more remote repositories in response to the request to initialize the application; and loading the one or more included application files and the one or more referenced application files.

9. The method of claim 8, wherein the descriptor includes a reference to each of the one or more repositories.

10. The method of claim 8, wherein:

the descriptor includes location data that specifies a network location for each of the one or more repositories; and the one or more referenced application files are retrieved using the location data.

11. The method of claim 8, wherein the distribution bundle includes an expected signature for each referenced application file, the method further comprising:

receiving a command to initialize the application; and comparing the expected signature for each referenced application file to an actual signature for each referenced application file.

12. The method of claim 11, wherein the distribution bundle includes a tamper policy that specifies an action to be performed in response to determining that an expected signature for a particular referenced application file does not match the actual signature for the particular referenced application file, the method further comprising:

determining, based on the comparison, that the expected signature for the particular referenced application file does not match the actual signature for the particular referenced application file; and performing the action in response to determining that the expected signature for the particular referenced application file does not match the actual signature for the particular referenced application file.

13. A system comprising:

one or more data processing apparatus; and a memory apparatus in data communication with the one or more data processing apparatus and storing instructions executable by the one or more data processing apparatus that when executed by the one or more data processing apparatus cause the one or more data processing apparatus to perform operations comprising:

receiving, for an application that uses a set of application files, selection data specifying one or more referenced application files that have been selected by a user for hosting by one or more remote repositories rather than being included in a distribution bundle for the application, the one or more referenced application files being a proper subset of the set of application files used by the application at runtime;

generating, based on the selection data, the distribution bundle for the application, the generating including:

including, in the distribution bundle, application code of the application;

determining, from the selection data, that the set of application files used by the application includes one or more included application files that have not been selected by the user for hosting by the one or more remote repositories;

in response to the determining, including, in the distribution bundle, the one or more included application files; and including, in the distribution bundle, and based on the selection data, a descriptor that includes a reference to each of the one or more referenced application files but does not include the referenced application files themselves, the descriptor causing the remote system to retrieve the one or more referenced application files from the one or more remote repositories in response to the application being initialized by the remote system, each referenced application file being referenced by the descriptor and not included in the distribution bundle; and providing the distribution bundle to a remote system.

14. The system of claim 13, wherein the generating comprises:

generating the descriptor based on the selection data.

15. The system of claim 13, wherein the operations further comprise receiving location data specifying the one or more remote repositories, wherein the descriptor includes a reference to each of the one or more remote repositories.

16. The system of claim 13, wherein the operations further comprise:

generating an updated version of one of the referenced application files;

generating an updated expected signature for the one referenced application file; and sending an update to the remote system that includes the updated expected signature and that causes the remote system to retrieve the updated version of the one referenced application file.

17. The system of claim 13, wherein the operations further comprise:

the distribution bundle includes an expected signature for each referenced application file of the set of application files; and the distribution bundle includes instructions that cause the remote system to compare the expected signature for each referenced application file to an actual signature for each referenced application file in response to receiving a command to initialize the application.

18. The system of claim 17, wherein the distribution bundle includes a tamper policy that specifies actions for the remote system to perform in response to determining that an expected signature for a particular referenced application file does not match the actual signature for the particular referenced application file.

19. The system of claim 18, wherein an action specified by the tamper policy includes retrieving a new copy of a particular referenced application file in response to determining that the expected signature for the particular referenced application file does not match the actual signature for the particular referenced application file.

20. The method of claim 1, wherein the set of application files include at least one application file that is used by multiple applications.

21. The method of claim 1, wherein the application code of the application includes a portion of code that is executed prior to main code of the application, the portion of code causing the remote system to use the descriptor to retrieve the one or more referenced application files from the one or more remote repositories in response to the application being initialized by the remote system and prior to the main application code being executed by the remote system.

22. The method of claim 1, wherein the one or more remote repositories are remote from, and in data communication with, the remote system.

* * * * *